(12) United States Patent
Meye

(10) Patent No.: US 6,209,959 B1
(45) Date of Patent: Apr. 3, 2001

(54) HEADREST

(76) Inventor: August Leon Meye, Schoenerstraat 71, 1503 BB, Zaandam (NL)

(*) Notice: Subject to any disclaimer, the term of this patent is extended or adjusted under 35 U.S.C. 154(b) by 0 days.

(21) Appl. No.: 09/462,349

(22) PCT Filed: Jul. 8, 1998

(86) PCT No.: PCT/NL98/00394

§ 371 Date: Jan. 7, 2000

§ 102(e) Date: Jan. 7, 2000

(87) PCT Pub. No.: WO99/02376

PCT Pub. Date: Jan. 21, 1999

(30) Foreign Application Priority Data

Jul. 9, 1997 (NL) .................................................... 1006516

(51) Int. Cl.⁷ .............................. B60N 2/48; B60R 22/00
(52) U.S. Cl. ...................................... 297/393; 297/216.12
(58) Field of Search .............................. 297/216.12, 391, 297/393, 464; 5/637

(56) References Cited

U.S. PATENT DOCUMENTS

| 4,339,151 | * | 7/1982 | Riggs | 297/393 X |
| 4,707,031 | * | 11/1987 | Meistrell | 297/393 |
| 5,081,714 | * | 1/1992 | Liu | 297/393 X |

FOREIGN PATENT DOCUMENTS

| 2316102 | * | 1/1977 | (FR) . |
| 2721880 | * | 1/1996 | (FR) . |
| 06156185 | * | 6/1994 | (JP) . |

* cited by examiner

*Primary Examiner*—Peter R. Brown
(74) *Attorney, Agent, or Firm*—Robert J. Van Derwall

(57) ABSTRACT

A headrest (1) to be used in vehicles and provided with fastening means for a headband to be positioned around the head of a passenger above the eyes and ears. The fastening means comprise a ring (5) suitable for the headband to be passed through. The fastening means compris a band (6) attached in the interior of the headrest, which extends through an opening (7) in the upholstery, and the ring (5) is fastened to the band at the exterior of the headrest.

3 Claims, 2 Drawing Sheets

HEADREST

The invention relates to a headrest to be used in means of transport such as automobiles intended for use on public roads, or aeroplanes.

Such a headrest is generally known and is used, for example in automobiles, aeroplanes and other means of transport such as space wagons, busses and the like. They have also been known to be applied in trains or subways. With all these means of transport there is a possibility that in the event of crashes or collisions an injury is sustained, the gravity of which has been recognized and acknowledged for some years. Said injury is the so-called whiplash occurring during a collision, when the head of the respecting occupant of the vehicle is moved back and forth in respect of the body. This causes a so-called acceleration/deceleration trauma of the cervical spinal column. Said injury occurs in particular when a body-fixating belt is worn. The complaints accompanying whiplash often give rise to long term absenteeism resulting from the many possible physical and psychological complaints, which include chronic fatigue. One thing and another may lead to partial and sometimes full disablement, in any case to long term incapacity for work.

DE-U-29,516,661 discloses an anti-whiplash provision to be used in a racing car. In this provision a band is attached to the helmet of the driver, which band is connected with a rotatable spool for winding and unwinding in the interior of the racing car, behind the head of the driver. The spool is provided with stopping means for blocking further rotation of the spool during accelerated unwinding of the band.

DE-U-9,001,789 discloses an anti-whiplash provision to be used with a child's seat. This involves a band construction which is applied around the child's head, and which band is coupled with a further band coming out of the back of the child's seat.

The French patent application FR-A-2,721,880 discloses an anti-whiplash provision comprising a headband which is coupled to a headrest by means of a band for fastening.

DE-A-4 306 555 discloses an anti-whiplash provision which is also designed as a headband coupled with the headrest of a seat.

In FR-A-2 316 102 a similar headrest is proposed, comprising attachment means for a headband to be positioned around the head above the eyes and ears of the user, which fastening means comprise a ring suitable for the headband to be passed through, wherein the fastening means comprise a band attached in the interior of the headrest, extending through an opening in the headrest's upholstery, with the ring being fastened to the band at the exterior of the headrest. This band material is pliable but strong.

The disadvantage of the headrest known from FR-A2 316 102 is that the ring forms a loose connection with the headband which may cause that the protection afforded by the headrest is less effective in preventing whiplash than desired. This particularly is the case when the connection between the ring and the headband has shifted from its central position behind the user's head at the moment the impact giving rise to the whiplash occurs. A certain twist of the head may than occur resulting in a whiplash despite the use of a headrest which is aimed to avoid such. The invention seeks to avoid this problem.

According to the invention the headband is provided with a flap which at a first end is attached to the headband and at the other end is provided with a first press-stud part for engaging a second press-stud part affixed on or in the headband. This provides a simple manner for detachably fastening the headband to the ring. Appropriately, the headband itself is not closed but forms an elongated band having a first and a second end which may be joined, for example by means of Velcro, a buckle or other fastening means.

The fact that from time to time the headband can be detached for cleaning, and that a headband can be applied made from a material or of a length or colour to concur with the user's wishes, is a further advantage which can only stimulate the use of the provision according to the invention. The material must be sufficiently strong to withstand the sudden enormous forces that may come to bear on it.

As a rule the headrest comprises an interior which is covered by upholstery. It is advantageous to provide the upholstery around the opening in the headrest with a metal edging whose maximum dimension is smaller than the diameter of the ring. This last measure ensures that the ring which is present at the exterior of the headrest, will not disappear into the interior of the headrest when the headband is detached. Of course, the band inside of the headrest, to which the ring is attached, can still smoothly slide in and out of the headrest.

The safety afforded by using the provision according to the invention is further served by the fact that in the proximity of the opening, the upholstery of the headrest inclines inwards. This measure means that the ring itself, which serves for the feed-through of the head band, will not give rise to injuries as it can be accommodated in the thus formed hollow, while at the same time the head of the user may contact the headrest even with considerable pressure, without touching said ring.

The attachment means for the headband may possibly form a stiff joint with the headrest or the interior of the headrest. However, it is preferred that the fastening means be equipped such that during use, they check decelerations or accelerations of the headband in relation to the headrest, while permitting uniform movements of the headband. A suitable embodiment of the above is characterized in that the fastening means comprise a rotatable spool for winding and unwinding the band attached to said spool in the interior of the headrest, and in that the spool is provided with stopping means which block further rotation of the spool during accelerated unwinding of the band.

The invention will now be explained in more detail with reference to the drawings, in which.

In the Figures similar parts are identified by identical reference numbers.

The Figures show a preferred embodiment of the headrest according to the invention, without restricting the scope of protection afforded by the appended claims.

Figure 1:
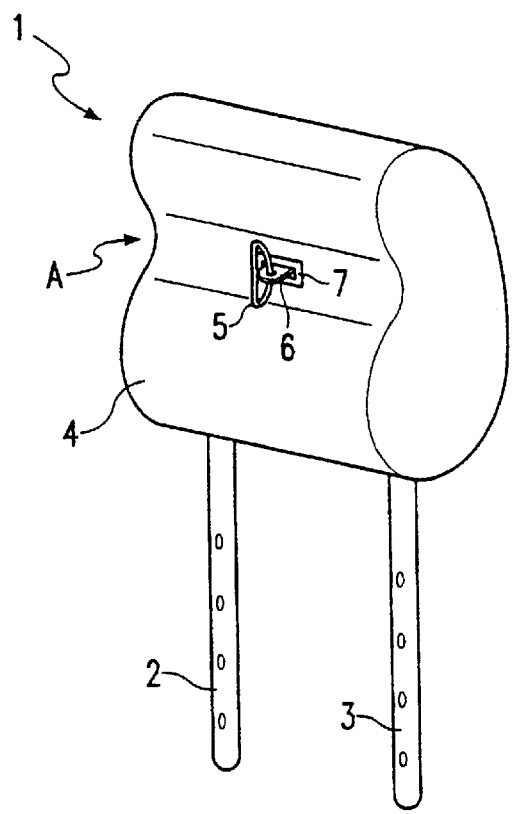
FIG. 1 shows the headrest in accordance with the invention.

FIG. 1 shows a separate headrest 1 that can be inserted into the backrest by means of the bars 2 and 3.

However, particular attention is drawn to the fact that the present invention does not merely relate to such separate headrests, but also applies to headrests that form an integral part with the backrest of a seat.

The headrest 1 comprises an interior covered by upholstery 4. However, the invention is also applicable when such upholstery 4 is absent. The headrest 1 is further provided with fastening means which include a ring 5 for a headband to be positioned around the head above the eyes and ears.

Figure 2:
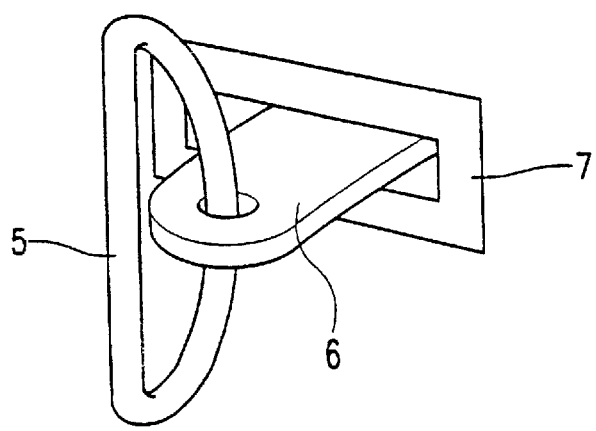
FIG. 2 is a detailed illustration of the band coming out of the headrest according to the invention, with a ring fastened thereto.

The ring 5 is attached to a band 6 (see also FIG. 2) extending through the upholstery 4 through an opening 7 in the upholstery 4, such that the ring 5 is attached to the band 6 at the exterior of the headrest 1. Around the opening 7 the upholstery 4 is provided with a metal edging whose maximum dimension is smaller than the diameter of the minimum dimension of the ring 5. It will be quite obvious to the expert that instead of a ring a differently shaped, not truly circular, element may be used so that instead of speaking of a diameter, the term minimum dimension would be applicable to this element.

As indicated by arrow A in FIG. 1, in the proximity of the opening 7, the upholstery 4 is inclined inwards. The thus formed hollow serves to accommodate the ring 5 without the user of the headrest 1 being inconvenienced by said ring 5.

Figure 3:
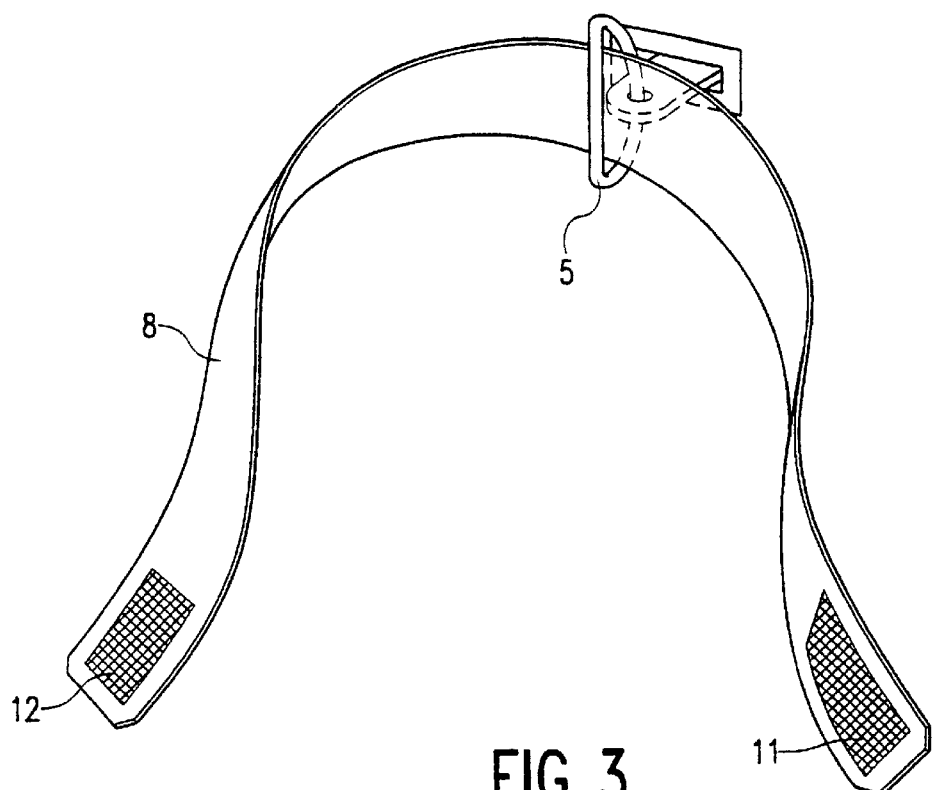
FIGS. 3 and 4 show different views of the ring through which the headband has been fed in accordance with the invention.
Figure 4:
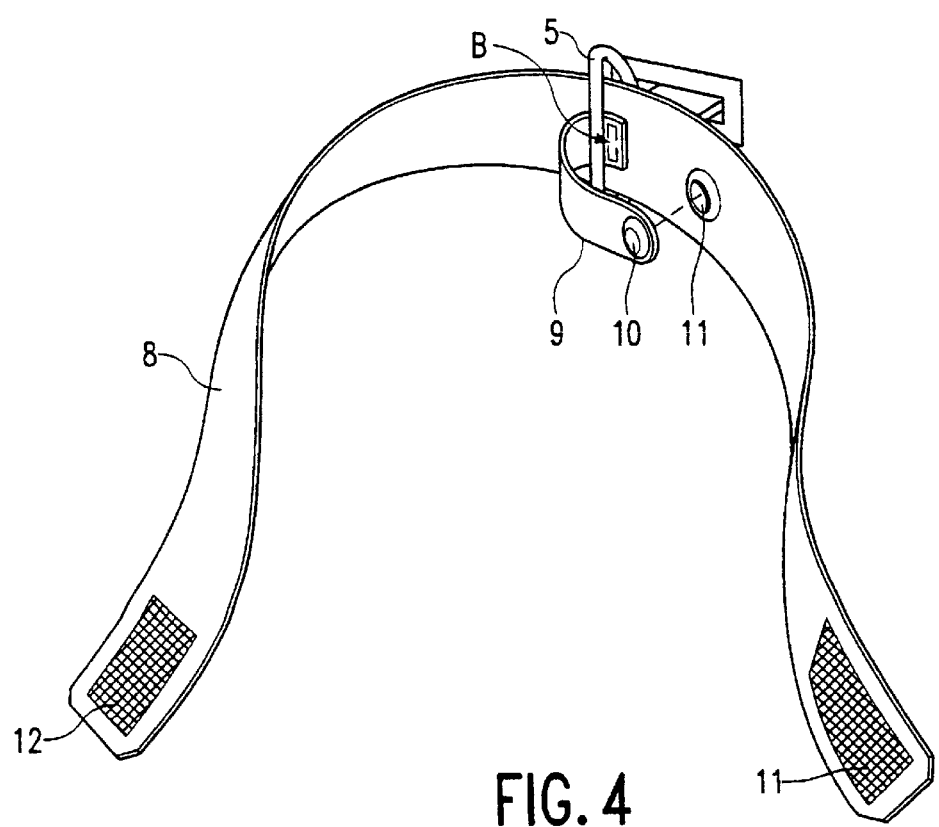

The fastening means of the headrest 1 are further equipped such that during use, deceleration or acceleration of the headband 8 which (as shown in FIG. 3 and FIG. 4), is fed through the ring 5, is absorbed, while uniform movements of the headband in relation to the headrest 1 are permitted.

To this end the headrest 1 is designed such that the fastening means comprise a rotatable spool for winding and unwinding the band attached to said spool in the interior of the headrest, and that the spool is provided with stopping means which block further rotation of the spool during accelerated unwinding of the band. This is not further illustrated in the Figures, but will be sufficiently clear to the expert.

When applying the invention, it is always of great importance that the safety headrest is always used together with the safety belt on the body.

If the headband is used on its own, and a collision occurs, the user runs the risk of being decapitated.

As shown in FIG. 3, the headband may be fitted through the ring 5 loosely or, as shown in FIG. 4, may be detachably attached to the ring 5 by means of a flap 9 which at a first end (as indicated by arrow B) is attached to the headband 8 and at the other end is provided with a first press-stud part 10 for engaging a second press-stud part 11 affixed on or in the headband 8.

In both the embodiments shown in FIG. 3 and in FIG. 4, the headband 8 is to be provided at its ends 11 and 12 with fastening means in the form of, for example Velcro, a buckle, press-studs or the like.

It will be clear to the expert, that within the scope of the invention sundry other variations on the described embodiment are feasible, all of which are deemed to be within the scope of the appended claims.

With respect to said claims, the above exemplary embodiment merely serves as elucidation, without limiting said claims in any way.

What is claimed is:

1. An upholstered to be used in means of transport such as automobiles intended for use on public roads, or aeroplanes, comprising fastening means for a headband which is adopted to be positioned around the head above the eyes and ears of the user, which fastening means comprise a ring suitable for the headband to be passed through, wherein the fastening means comprise a band attached in the interior of the headrest, which extends through an opening in the headrest's upholstery, and the ring is fastened to the band at the exterior of the headrest, characterized in that the headband is provided with a flap which at a first end is attached to the headband and at the other end is provided with a first press-stud part for engaging a second press-stud part affixed on or in the headband, so as to allow the headband to be detachably attached to the ring.

2. A headrest according to claim 1, characterized in that the upholstery around the opening in the headrest is provided with a metal edging, whose maximum dimension is smaller than the diameter of the ring.

3. A headrest according to one of the claim 1 or 2, characterized in that in the proximity of the opening, the upholstery of the headrest inclines inwards.

* * * * *